(12) United States Patent
Xu et al.

(10) Patent No.: US 11,699,048 B2
(45) Date of Patent: Jul. 11, 2023

(54) WIRELESS SENSING UNITS, SYSTEMS, METHODS, AND MEDIA

(71) Applicants: Qiang Xu, Thornhill (CA); Jun Li, Markham (CA); Chenhe Li, Markham (CA)

(72) Inventors: Qiang Xu, Thornhill (CA); Jun Li, Markham (CA); Chenhe Li, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/107,208

(22) Filed: Nov. 30, 2020

(65) Prior Publication Data
US 2022/0171949 A1 Jun. 2, 2022

(51) Int. Cl.
*G06K 7/10* (2006.01)
*G06K 19/077* (2006.01)
*G06K 19/07* (2006.01)

(52) U.S. Cl.
CPC ..... *G06K 7/10366* (2013.01); *G06K 7/10346* (2013.01); *G06K 19/0723* (2013.01); *G06K 19/07786* (2013.01)

(58) Field of Classification Search
CPC ........... G06K 7/10366; G06K 7/10346; G06K 19/0723; G06K 19/07786
See application file for complete search history.

(56) References Cited

U.S. PATENT DOCUMENTS

| 5,695,859 | A | * | 12/1997 | Burgess | H01H 1/029 |
| | | | | | 200/85 R |
| 9,065,423 | B2 | * | 6/2015 | Ganem | H02J 50/60 |
| 9,370,125 | B2 | * | 6/2016 | Abuelsaad | H05K 7/20745 |
| 2006/0202832 | A1 | | 9/2006 | Reznik et al. | |

(Continued)

FOREIGN PATENT DOCUMENTS

| CN | 108474360 A | | 8/2018 | |
| EP | 2663846 B1 | * | 2/2018 | B29C 66/729 |

OTHER PUBLICATIONS

Sundholm, M. et al. "Smart-Mat: Recognizing and Counting Gym Exercises with Low-cost Resistive Pressure Sensing Matrix" Proceedings of the 2014 ACM International Joint Conference on Pervasive and Ubiquitous Computing Sep. 2014.

(Continued)

*Primary Examiner* — Sonji N Johnson

(57) ABSTRACT

Wireless sensing units, methods, systems, and processor-readable media for obtaining pressure data relating to one or more pressure locations of a surface area are described. A wireless sensing system includes a pressure monitoring device communicating with modular wireless smart floor tiles using RFID, either using an RFID reader or wireless network interface (e.g., 802.11). The tiles incorporate passive or active RFID tags. The tiles can be powered wirelessly, e.g. by a built-in piezoelectric power unit or by a wireless power source using magnetic resonance. A data capture circuit in each tile collects and saves the data for transmission to the floor pressure monitoring device. Various software applications can be enabled by the smart floor system, including fall detection and prediction, gesture input, intrusion detection, and user location tracking for smart home automation.

20 Claims, 7 Drawing Sheets

(56) References Cited

U.S. PATENT DOCUMENTS

| | | | | |
|---|---|---|---|---|
| 2007/0069021 | A1* | 3/2007 | Elrod | G06K 17/00 |
| | | | | 235/451 |
| 2010/0176189 | A1* | 7/2010 | Gray | G01S 1/68 |
| | | | | 235/375 |
| 2011/0027520 | A1 | 2/2011 | Lauterbach et al. | |
| 2012/0323501 | A1* | 12/2012 | Sarrafzadeh | A61B 5/6804 |
| | | | | 702/41 |
| 2015/0054649 | A1* | 2/2015 | Desgorces | A61B 5/6889 |
| | | | | 340/573.1 |
| 2016/0217664 | A1* | 7/2016 | Bradford | E04F 15/02 |
| 2017/0116445 | A1* | 4/2017 | Debates | G06K 19/07345 |
| 2018/0306657 | A1 | 10/2018 | Wagenaar | |
| 2019/0333354 | A1 | 10/2019 | Schwab et al. | |
| 2020/0225767 | A1* | 7/2020 | Ben-Shalom | G06F 3/041 |
| 2020/0341457 | A1* | 10/2020 | Prugh | G08B 13/10 |
| 2021/0159738 | A1* | 5/2021 | Yu | H02J 50/40 |
| 2021/0248879 | A1* | 8/2021 | Khojastepour | G06K 7/10356 |

OTHER PUBLICATIONS

Wu. F., et al. "Development of a Wearable-Sensor-Based Fall Detection System" International Journal of Telemedicine and Applications Feb. 2015.

Vezzani, R. et al. "A General-Purpose Sensing Floor Architecture for Human-Environment Interaction" ACM Transactions on Interactive Intelligent Systems Jun. 2015.

Ho, S. L., et al. "A comparative study between novel witricity and traditional inductive magnetic coupling in wireless charging." IEEE Transactions on Magnetics 47.5; p. 1522-1525. 2011.

Website: Fraunhofer Institute for Factory Operation "Tactile Sensor Systems in Pressure-sensitive Flooring" https://www.iff.fraunhofer.de/en/business-units/robotic-systems/tactile-sensor-systems-pressure-sensitive-flooring.html Jun. 2018.

Website: Future-Shape GmbH "SensFloor: The Basic Concept" https://future-shape.com/en/system/ May 2017.

Website: Cisper Electronics B.V. "The different types of RFID Systems" https://www.cisper.nl/en/the-different-types-of-rfid-systems. Before Sep. 2020.

Website: Impinj, Inc. "Types of RFID Systems" https://www.impinj.com/about-rfid/types-of-rfid-systems. Before Sep. 2020.

Website: The Green Microgym "Electricity-Generating Fitness Equipment" https://www.thegreenmicrogym.com/ Feb. 2012.

Website: Pavegen Systems "Pavegen Transforms Footsteps into Clean-Electricity and Data into Insight!" Sep. 2009.

* cited by examiner

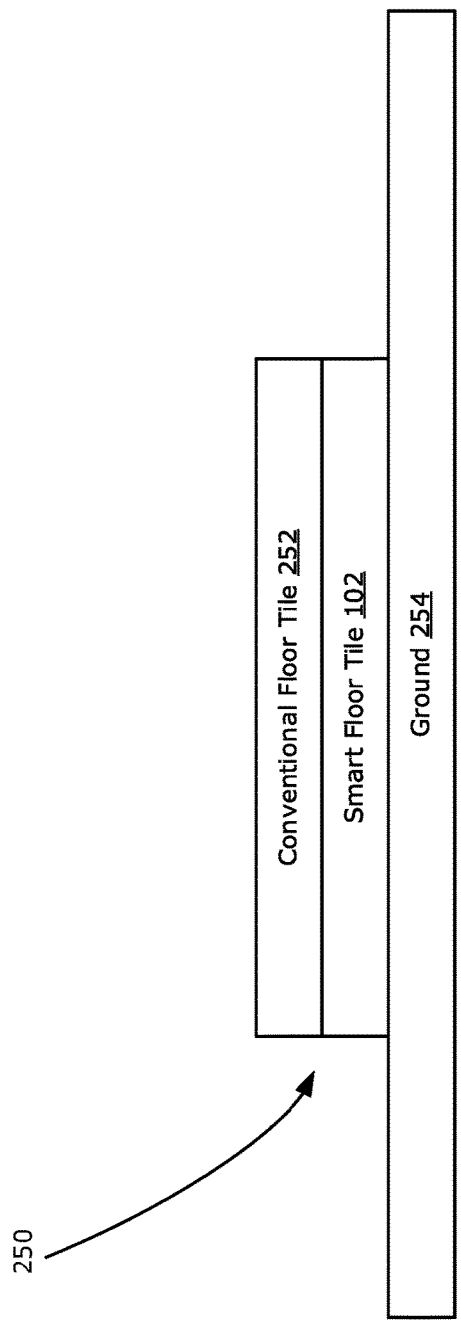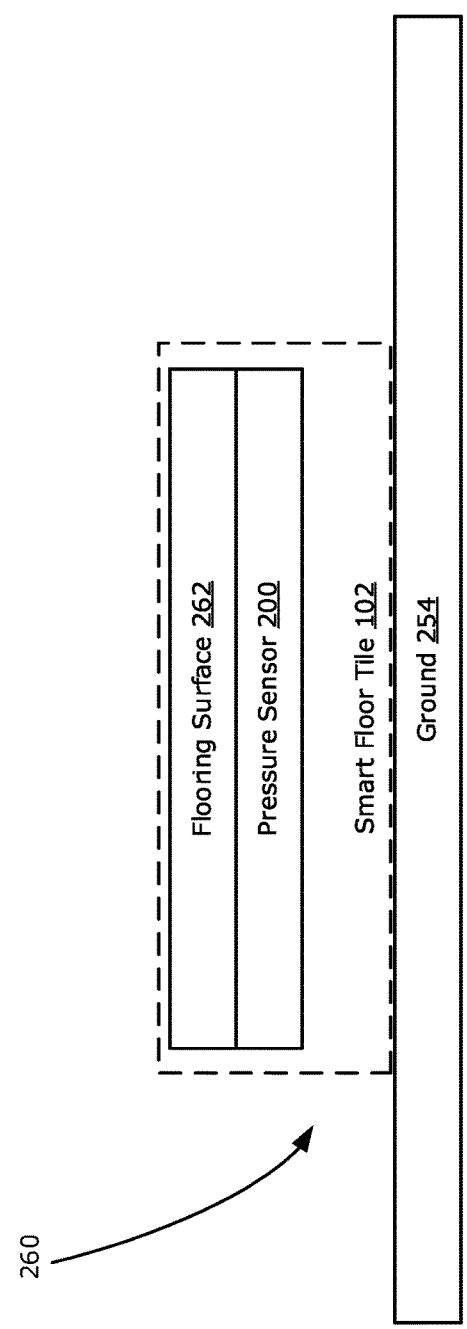

WIRELESS SENSING UNITS, SYSTEMS, METHODS, AND MEDIA

RELATED APPLICATION DATA

This is the first patent application related to this matter.

FIELD

The present application generally relates to human-machine interfaces and smart home sensors, and in particular to wireless sensing unit, methods, systems, and processor-readable media for collecting pressure data relating to a plurality of pressure locations of a surface area.

BACKGROUND

Sensing environments are an approach to Human-Computer Interaction (HCI) that seeks to enable user interactions with either virtual environments or the real world through natural human movements and behaviors in a space equipped with sensors, such as cameras or microphones.

One sensing methodology that can be used in sensing environments is floor-based sensors for detecting the presence and/or activity of humans or other objects on a floor surface. Existing floor-based sensors typically involve a network of pressure sensors underlying a flooring surface. The sensor network receives power from a power cable plugged into a power source, such as a building's electrical wiring, and communicates with a data processing device via a wired communication interface (e.g. Ethernet) or a wireless communication interface (typically 802.11 or Bluetooth™).

These existing approaches have a number of limitations. First, the network of sensors requires a power cable to be routed under the floor to power the sensors, and in some cases also requires a data cable to be routed under the floor for capturing the sensor data. Second, the sensors are typically wired in series, such that a fault, malfunction or damage in one part of the sensor network may render the entire network unusable. Isolating a fault in the sensor network and repairing or replacing the faulty part may also require removing all of the flooring covering any part of the sensor network. Furthermore, the analog data generated by the sensors in the sensor network typically needs to be collected and processed by the data processing device; as the size of the sensor network increases, this data collection and processing may become unmanageable.

There is therefore a need for a floor-based sensor system that overcomes one or more of the limitations of existing approaches identified above.

SUMMARY

The present disclosure describes wireless sensing units, methods, systems, and processor-readable media for obtaining pressure data relating to a plurality of pressure locations of a surface area, such as a floor. A wireless sensing system for obtaining pressure data may include a wireless pressure monitoring device such as a computer, which communicates with individual modular wireless sensing units using radio frequency identification (RFID), either using an RFID reader or a standard radio wireless network interface (e.g., 802.11). The wireless sensing units incorporate RFID tags configured to communicate using passive or active RFID. Due to the low power requirements of RFID tags and the other electronics used by the tiles, the tiles can be powered wirelessly, e.g. by a built-in piezoelectric power unit to harvest energy from footsteps, or by harvesting power from a wireless power source using magnetic resonance. A data capture circuit built into each tile collects and saves the data for transmission to the surface pressure monitoring device. Various software applications can be enabled by the wireless sensing system, including fall detection and prediction, gesture input, intrusion detection, and user location tracking for smart home automation.

By placing a plurality of modular wireless sensing device, for example wireless smart floor tiles, within a surface area, such as a floor area, the system can capture and measure the pressure field exerted by people or objects on the surface. Instead of optical images, the surface generates a 2D pressure map of "pressure image" in which each "pixel" corresponds to a spatial portion of the surface (also called a "pressure location" herein), and the "pixel value" is related to the amount of pressure applied on top of it. Surface images may be analyzed using traditional computer vision and pattern recognition techniques in order to detect people and their behaviors. The system may enable a range of applications, including entertainment, surveillance, multimedia content access, and medical rehabilitation.

Embodiments described herein may exhibit one or more advantages over existing approaches. By using independent sensing units, for example modular tiles, a fault or failure of one unit leaves the rest of the surface functional, and the faulty tile can be easily identified and repaired or replaced as needed. By eliminating the need for power cables and data cables, the wireless sensing units, for example wireless floor tiles, can be installed anywhere without the need to tear out adjacent flooring or other surface coverings to route cables, and there is no risk of a failure due to damage to the cables. By using low-power RFID and other low-power components, the power consumption of the unit is minimized, potentially lowering costs and extending the lifetime of the components. RFID tags, and particularly passive RFID tags, are very inexpensive, thereby lowering the cost of large surface area installations. By using a dedicated data capture circuit within each tile, the analog-to-digital conversion and filtering or other pre-processing of the sensor data is accomplished in a distributed fashion, allowing the size of the surface to be scaled up without creating a data collection or processing bottleneck at the surface pressure monitoring device due to exponentially increasing complexity, cost, and difficulty of data collection and processing as the surface area increases. Other advantages will be apparent based on the detailed description of example embodiments below.

As used herein, the terms "radio-frequency identification tag" or "RFID tag" refer to a radio transponder configured to transmit digital data in response to an electromagnetic interrogation pulse from an RFID reader device. RFID tags include active, passive, and semi-passive configurations; passive RFID tags typically do not require their own power source, using energy from the interrogating radio waves from the reader to transmit data back to the reader, whereas active and semi-passive RFID tags typically include or rely upon a power source in order to transmit data.

As used herein, the term "RFID reader" may refer either to a dedicated RFID reader device, or to a radio-based communication module of a radio-enabled device, such as an 802.11 or Bluetooth™-based network interface of a computer or smartphone. Whereas passive RFID tags typically require a dedicated RFID reader device in order to function, some active RFID tags may be able to transmit data directly to other radio-enabled devices. RFID tags may operate in any of several frequency bands (also referred to herein as "RFID signal bands"): low-frequency (LF) bands such as 120-150 kHz; high-frequency (HF) bands such as 13.56 MHz; ultra-high frequency (UHF) bands such as 433 MHz, 865-868 MHz, or 902-928 MHz; or microwave bands such as 2450-5800 MHz or 3.1-10 GHz.

As used herein, the term "wireless sensing unit" refers to a pressure-sensing device containing electronic hardware enabling collection and transmission of pressure data without the need for wires, cables, or other conduits for conveying data or power to or away from the tile. A "wireless smart floor tile" is an example of a "wireless sensing unit", and example embodiments of wireless sensing units may be described herein as wireless smart floor tiles. Unless otherwise indicated, the term "tile" used herein shall be used to refer to a wireless smart floor tile.

As used herein, the term "data capture circuit" refers to an electronic component or set of electronic components configured to receive, collect or capture data. Example data capture circuits are described below in reference to various embodiments.

As used herein, the term "conductive layer" refers to a layer of a floor tile, at least a portion of which is electrically conductive.

As used herein, the term "power storage device" refers to a device for storing electrical power or energy, such as a battery or a capacitor.

As used herein, the term "wireless power unit" refers to a component of a wireless smart floor tile that supplies power to one or more other components of the tile without receiving power from a cable, wire, or other conduit. Examples of wireless power units described herein include components for generating electrical energy within the tile (e.g. using piezoelectrics) or components for receiving energy transmitted wirelessly (e.g. using magnetic resonance). The latter type of component may be referred to herein as a "remote power receiver unit".

As used herein, the term "flooring surface" refers to an upper surface of a floor tile intended to engage directly with the soles of people's feet or other objects placed on the floor, such as furniture legs.

In some aspects, the present disclosure describes a wireless sensing unit, comprising a pressure sensor configured to detect pressure applied to each of a plurality of locations on a surface of the wireless sensing unit, a data capture circuit configured to generate digital pressure data based on the pressure detected at each of the plurality of locations by the pressure sensor, and a radio-frequency identification (RFID) tag for transmitting the digital pressure data.

In some aspects, the present disclosure describes a pressure monitoring device, comprising an RFID communication interface configured to obtain digital pressure data from an RFID reader, a memory having stored thereon sensing unit location data indicating one or more sensing unit locations, and a processor for executing instructions that cause the pressure monitoring device to determine a pressure level at each of one or more pressure locations based on the digital pressure data and the sensing unit location data.

In some aspects, the present disclosure describes a method for obtaining pressure data relating to one or more pressure locations of a surface area, comprising, for each of one or more wireless sensing units positioned at one or more sensing unit locations within the surface area, detecting pressure applied to each of one or more locations on a surface of the wireless sensing device using a pressure sensor of the wireless sensing device, generating digital pressure data based on the pressure detected at each of the one or more locations by the pressure sensor using a data capture circuit of the wireless sensing device, and transmitting the digital pressure data to an RFID reader using a radio-frequency identification (RFID) tag of the wireless sensing device.

In some examples, the RFID tag transmits the pressure data at an ultra-high frequency (UHF) RFID signal band.

In some examples, the pressure sensor comprises a first conductive layer, an electrically sensitive layer exhibiting changes in its electrical properties in response to compression, and a second conductive layer.

In some examples, the electrically sensitive layer comprises a capacitance sensitive material, and the electrical properties comprise capacitance.

In some examples, the electrically sensitive layer comprises a resistance sensitive material, and the electrical properties comprise resistance.

In some examples, the wireless sensing unit further comprises a power storage device for providing power to one or more components selected from the list of the pressure sensor, the data capture circuit, and the RFID tag.

In some examples, the wireless sensing unit further comprises a wireless power unit configured to wirelessly charge the power storage device.

In some examples, the wireless power unit comprises a piezoelectric power generating unit configured to harvest kinetic energy from objects applying force to the wireless sensing unit.

In some examples, the wireless power unit comprises a remote power receiver unit configured to receive power from a wireless power source using magnetic resonance.

In some examples, the RFID tag is a passive RFID tag.

In some examples, the wireless sensing unit comprises a wireless floor tile.

In some examples, the pressure sensor is configured to detect the pressure from a conventional floor tile located above the wireless sensing unit.

In some examples, the wireless sensing unit further comprises a flooring surface located above the pressure sensor.

In some examples, the pressure monitoring device further comprises the RFID reader, wherein the RFID reader is configured to obtain the digital pressure data from one or more RFID tags.

In some examples, the RFID communication interface comprises a wireless network interface, and the RFID reader comprises a radio antenna.

In some examples, the method further comprises determining a pressure level at each of the one or more pressure locations based on the digital pressure data and the one or more sensing unit locations.

In some examples, the RFID tag of each wireless sensing device is a passive RFID tag, the RFID reader is configured to transmit interrogator RFID signals to each RFID tag, and each RFID tag is configured to transmit the digital pressure data to the RFID reader in response to receiving an interrogator RFID signal from the RFID reader.

In some examples, the method further comprises powering each wireless sensing unit using a wireless power unit.

In some aspects, the present disclosure describes a processor-readable medium having instructions tangibly stored thereon. The instructions, when executed by a processor device, cause the processor device to perform the method steps described above.

BRIEF DESCRIPTION OF THE DRAWINGS

Reference will now be made, by way of example, to the accompanying drawings which show example embodiments of the present application, and in which:

FIG. 2D is a simplified side cross-sectional view of a first example configuration of a wireless sensing unit of FIG. 2A.

FIG. 2E is a simplified side cross-sectional view of a second example configuration of a wireless sensing unit of FIG. 2A.

Similar reference numerals may have been used in different figures to denote similar components.

DESCRIPTION OF EXAMPLE EMBODIMENTS

In various examples, the present disclosure describes wireless sensing units, methods, systems, and processor-readable media for obtaining pressure data relating to a plurality of pressure locations of a surface area. Example embodiments of wireless sensing units may be described herein as wireless smart floor tiles, which may be used to collect pressure data relating to a plurality of pressure locations of a floor area. However, it will be appreciated that some embodiments may include one or more wireless sensing units that are not used as floor tiles: for example, wireless sensing units may be installed on a vertical surface such as a wall for sensing impacts with the vertical surface. Furthermore, some embodiments may use a single wireless sensor unit instead of tiling multiple wireless sensor units together to cover a large surface area: for example, a single wireless sensor unit may be used to provide input to a fitness software application by acting as a weight scale and/or an exercise mat measuring a user's balance, weight distribution, body movement, and so on.

In some embodiments, a wireless sensing system (such as a smart floor system) includes wireless sensing units (such as wireless smart floor tiles) having RFID tags configured to communicate with an RFID reader at an ultra-high frequency (UHF) RFID signal band. In some embodiments, the tiles include passive RFID that do not require their own power source. In other embodiments, active RFID tags are used in the tiles, powered by a wireless power unit. Each tile is configured to operate independently of the other tiles used in a given smart floor system, such that failure of a single tile won't affect the other tiles. In some embodiments, each tile includes its own data capture circuit and wireless power unit, allowing the smart floor area to expand without degrading performance.

In some embodiments, the smart floor system may be used to provide input to various software applications. The smart floor system can collect pressure data from users' daily life and may be combined with traditional computer vision and pattern recognition techniques to detect users and their behaviors, such as users' positions, movement patterns, orientations, and distance traveled. Using these detected behaviors, software may perform tasks such as predicting or detecting falls by users, monitoring user life styles, assisting users with physical rehabilitation tasks, detecting user load and fatigue, and so on.

Example Wireless Sensing System

Figure 1:
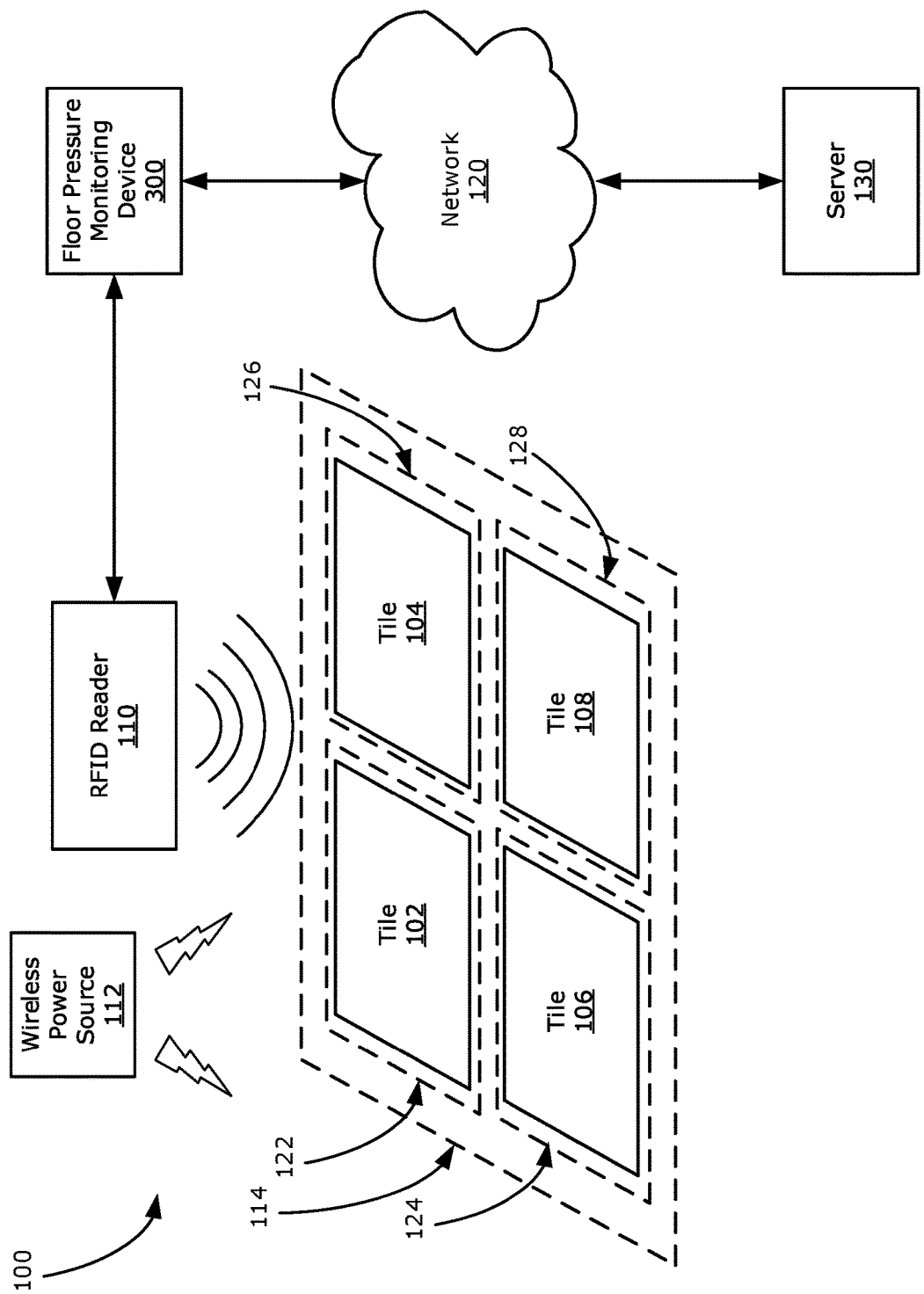
FIG. 1 is a block diagram showing a wireless sensing system for obtaining pressure data relating to a plurality of pressure locations of a floor area, in accordance with embodiments described herein.

FIG. 1 is a block diagram of a wireless sensing system, shown as smart floor system 100, for collecting pressure data relating to a plurality of pressure locations of a surface area (shown as floor area 114). The system 100 includes a plurality of wireless smart floor tiles 102, 104, 106, 108, and an RFID reader 110. Optionally, the system 100 may also include a floor pressure monitoring device 300, a wireless power source 112, and/or a server 130 communicating with the floor pressure monitoring device 300 over a network 120.

In use, each wireless smart floor tile 102, 104, 106, 108 is installed at a respective sensing unit location (shown as tile locations 122, 124, 126, 128) of a floor area 114. Each tile location 122, 124, 126, 128 is known to a device receiving floor pressure data from the RFID reader 110 (such as the floor pressure monitoring device 300) such that the pressure data received from each wireless smart floor tile 102, 104, 106, 108 can be mapped to a 2D pressure map of the floor area 114. In some embodiments, the tile locations 122, 124, 126, 128 are represented by sensing device location data (shown as tile location data 350) stored in a memory of the floor pressure monitoring device 300, as described below with reference to FIG. 3. The tile location data 350 may be generated manually by a person installing the tiles or by an automatic process. For example, in some embodiments the tile locations may be automatically measured or ascertained using known distance-sensing or location-sensing technologies, such as laser or infrared range-finding or radio-frequency signal triangulation. In some embodiments, the RFID reader 110, floor pressure monitoring device 300, and/or another radio-enabled device may be used to automatically determine the location of each tile using the signals transmitted by the RFID tag of each tile.

An example wireless smart floor tile 102 is described in detail below with reference to FIGS. 2A-2E.

In some embodiments, the RFID reader 110 is a dedicated RFID reader device, such as a fixed or mobile RFID reader. In other embodiments, the RFID reader 110 is a radio-based communication module of a radio-enabled device, such as an 802.11 or Bluetooth™-based network interface of a computer or smartphone. Whereas passive RFID tags typically require a dedicated RFID reader device in order to function, some active RFID tags may be able to transmit data directly to other radio-enabled devices.

Thus, a smart floor system 100 using tiles having active RFID tags may use an existing wireless network interface of the floor pressure monitoring device 300, as described below with reference to FIG. 3, as the RFID reader 110. The floor pressure monitoring device 300 may be installed or operated anywhere within the transmitting range of the active RFID tags of the tiles, which may be up to approximately 100 meters in embodiments using active UHF RFID tags.

A smart floor system 100 using tiles having passive RFID tags may use a dedicated RFID reader 110, which may in turn be in communication with the floor pressure monitoring device 300 via a network interface or input/output interface of the floor pressure monitoring device 300. The dedicated RFID reader 110 may be an RFID reader configured to transmit interrogator RFID signals to each RFID tag. In some examples, a smart floor system 100 using tiles having passive RFID tags may include a dedicated RFID reader 110 configured to configured to attach to a piece of furniture or fixture (e.g. a ceiling light fixture) located above the floor area 114 or otherwise in the same environment (e.g. the same room) as the floor area 114. By installing the RFID reader 110 in proximity to the floor area 114, the passive RFID tags of the tiles may be more effectively interrogated by the RFID reader 110, facilitating transmission of data from the tiles to the RFID reader 110. Passive UHF RFID tags may have an effective range of approximately 12 meters.

An example floor pressure monitoring device 300 is described in greater detail below with reference to FIG. 3.

Some embodiments may include a wireless power source 112 configured to transmit power to a remote power receiver unit of each tile using magnetic resonance. The use of magnetic resonance to transmit power wirelessly may include resonant inductive coupling or magnetic phase synchronous coupling, such as the wireless power transmission technologies developed by WiTricity™. The wireless power source 112 may include a transmitter coil in communication with a power supply (such as a building's electrical system), and the remote power receiver unit of each tile may include a receiver coil paired to the transmitter coil of the wireless power source 112.

A server 130 may be used in some embodiments to execute high-level software applications using pressure data collected from the tiles 102, 104, 106, 108. The server 130 may be a mobile electronics device, a desktop computer, an internet server, a distributed cloud computing platform, or any other suitable computing platform. In some embodiments, the server 130 communicates with the floor pressure monitoring device 300 via a network 120. The network 120 may be a local area network (LAN), a wide area network (WAN) such as the internet, a wireless mesh network, or any other combination of wired and/or wireless communication links enabling communication between electronic devices. In other embodiments, the functions of the server 130 may be performed by the floor pressure monitoring device 300 itself.

Various software applications may be able to use the digital pressure data gathered from a smart floor system 100, either on its own or in combination with other input data. The server 130 and/or floor pressure monitoring device 300 may execute various instructions on their respective processors to implement software applications such as virtual reality (VR), augmented reality (AR), multimedia playback, fitness tracking, physical rehabilitation assistance, health monitoring, and smart home automation making use of the digital pressure data. For example, a VR or AR application may use the digital pressure data to determine the location and orientation of a user's feet. Digital pressure data may be used by a health or fitness application to determine a user's weight, posture, and/or physical activity being performed. A health or rehabilitation application may monitor the digital pressure data to predict or detect falls, alerting a user if their current behavior indicates a risk of falling or alerting emergency services or personal care staff if a fall occurs. Some software applications may use the distribution of a user's weight over time to detect a user's body movements, potentially enabling the application to detect gestures performed with portions of the user's body; these gestures can be used as inputs to any software application, e.g. acting as a switch or remote control.

In a first example, the floor pressure monitoring device 300 may construct a pressure map of the floor area 114 based on the digital pressure data, and the server 130 could use the pressure map to track the motion, path, and current location of a user over the floor area 114. For example, the distance traveled by the user and an estimated user fatigue level may be computed based on the user location information over time. Smart home systems (e.g. lighting, air conditioner, ventilation) can be controlled based on a user's current location (e.g. turning lights on and ventilation up when a user enters a room and off or down when the user leaves the room).

In a second example, all or part of the floor area 114 could be designated as a forbidden area by an intrusion detection software application running on the server 130. An alarm could be triggered when a person is detected entering the forbidden area based on the digital pressure data. In some examples, the pressure distribution patterns of an authorized person (e.g. a home resident) could be recognized based on a user profile, and detection of a user having an unrecognized pressure profile entering the forbidden area would be considered an intrusion event and trigger an alarm.

Example Wireless Sensing Unit

Figure 2A:
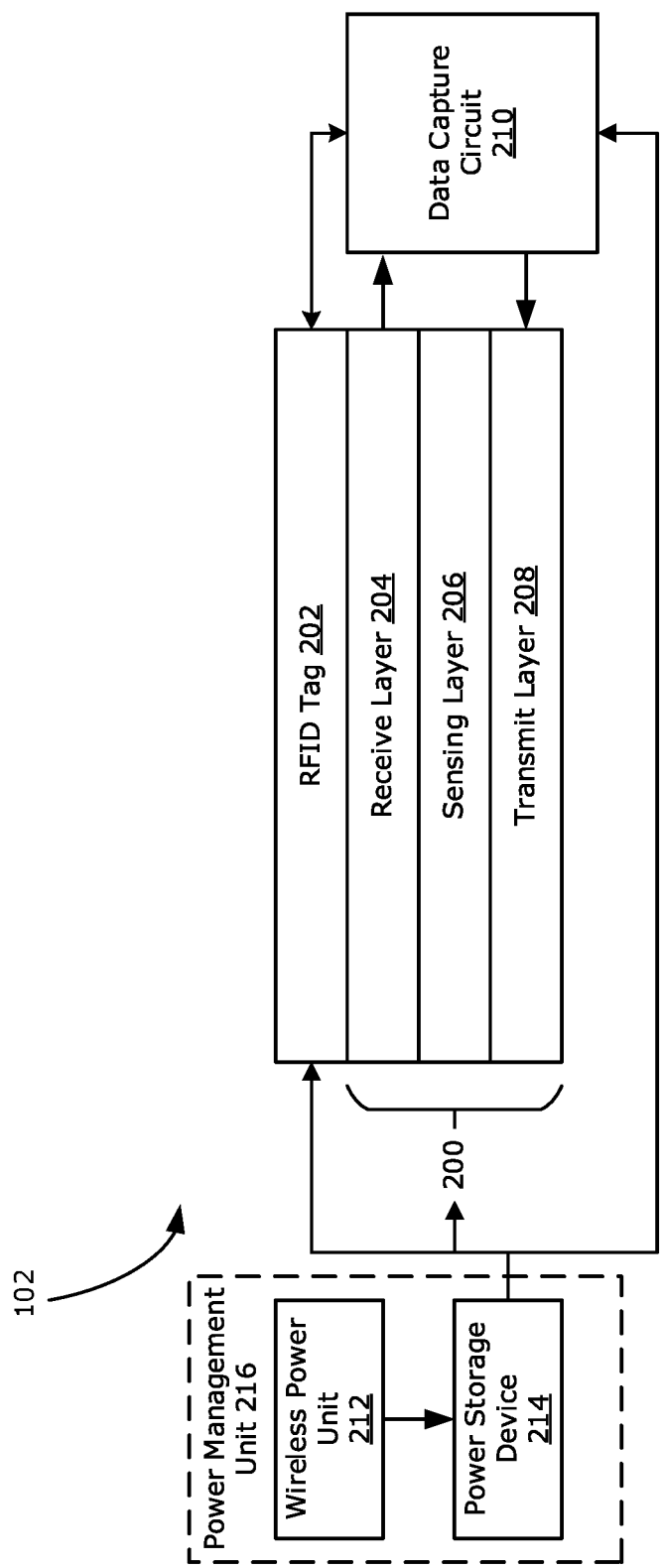
FIG. 2A is a block diagram showing an example wireless sensing unit of the wireless sensing system of FIG. 1.

FIG. 2A is a block diagram of an example wireless sensing unit, shown as a smart floor tile 102 of the smart floor system 100 of FIG. 1. Four layers 202, 204, 206, 208 of the tile are shown arranged from top to bottom. In some embodiments, the relative locations of these four layers in FIG. 2A may correspond to their relative locations in a side cross-sectional view of the tile 102. The first, top-most layer is an RFID tag 202. The RFID tag 202 includes one or more electrical components or circuits, including an RFID receiver circuit and an RFID transmitter circuit. In some embodiments, the RFID tag 202 also includes electronic components for processing and/or storing received data and/or data to be transmitted. In some embodiments, some or all of the functions of the processing and/or storing functions may be performed by the data capture circuit 210 described below.

In some embodiments, the RFID tag 202 is configured to communicate in a UHF RFID signal band, such as 433 MHz, 865-868 MHz, or 902-928 MHz. Lower RFID frequencies (such as HF or LF bands) may be used in some embodiments, but may result in a shorter read range and/or a slower data read rate for the RFID reader 110. Various inexpensive UHF RFID chipsets currently on the market provide ultra-low power consumption features that make them suitable for incorporation into various embodiments described herein. Furthermore, many UHF RFID product manufacturers have found ways of designing tags, antennas, and readers to keep performance high even in difficult environments (e.g. high-interference environments). Passive UHF RFID tags also tend to be easier and cheaper to manufacture than LF and HF RFID tags. Thus, use of UHF RFID tags may provide several advantages over the alternatives.

The second, and fourth layers of the tile 102 collectively compose a pressure sensor 200. An example pressure sensor 200 is described in greater detail below with reference to FIG. 2B, and an alternative pressure sensor 240 is described in greater detail below with reference to FIG. 2C.

The tile 102 includes a data capture circuit 210 for capturing sensor data from the pressure sensor 200, performing processing operations on the sensor data, and providing the processed data to the RFID tag 202. The data capture circuit 210 may be an integrated circuit (IC) in some embodiments. In some examples, the data capture circuit 210 may also operate as a power management unit to receive power from a power source and supply power in turn to one or more components of a wireless smart floor tile 102. In some examples, the data capture circuit 210 actively transmits a signal to or through the pressure sensor 200 to elicit pressure sensor output, which is collected by the data capture circuit 210. In some examples, a data capture circuit 210 includes an analog-to-digital converter (ADC) for converting captured analog pressure sensor 200 data (i.e. the output of the pressure sensor 200) into digital pressure data, which is provided to the RFID tag 202 of the wireless smart floor tile 102. The digital pressure data may be further processed or filtered by the data capture circuit 210 before being provided to the RFID tag 202 in some examples. In some embodiments, the electronic components of two or more of the RFID tag 202, pressure sensor 200, and/or data capture circuit 210 may be combined in a single electronic component or circuit.

The second layer of the tile 102 is a receive layer 204 used by the data capture circuit 210 to receive the pressure sensor output. The fourth layer of the tile 102 is a transmit layer 208 used by the data capture circuit 210 to transmit the signal through the pressure sensor 200 to elicit pressure sensor output. The third layer of the tile 102 is a sensing layer 206 that includes an electrically sensitive layer exhibiting changes in its electrical properties in response to compression. The signal transmitted through the transmit layer 208 results in pressure sensor output at the receive layer 204 whose characteristics are determined by the distribution and magnitude of compression of portions of the sensing layer 206. Thus, the data capture circuit 210 generates a signal (e.g. a pulse) on the pins of the transmit layer 208 and collects the resulting feedback signal from the pins of the receive layer 204. The feedback signal values of the pins of the receive layer 204 may be processed to determine a pressure level at each of a plurality of locations of the tile 102. The structure and operation of example pressure sensors 200, 240 are described in greater detail below with reference to FIGS. 2B-2C.

The tile 102 may optionally include a power management unit 216, which may include a wireless power unit 212 and/or power storage device 214. The power management unit 216 may include electronic logic components to manage the harvesting and supply of power for powering one or more electronic components of the tile 102. In some embodiments, the power management functions of the power management unit 216 may be performed by the data capture circuit 210.

In some embodiments, the power storage device 214 is a battery. In other embodiments, the power storage device 214 includes a supercapacitor to store electrical power and a buck-boost circuit to convert the supercapacitor's voltage to a constant output voltage. In some embodiments, the output voltage of the power storage device 214 may be approximately 3.3V or 1.8V. The power storage device 214 may be configured to supply electrical power to one or more components of the tile 102: the RFID tag 202 (if an active RFID tag), the data capture circuit 210, and/or the pressure sensor 200.

In some embodiments, a wireless power unit 212 is included in the power management unit 216. The wireless power unit 212 may harvest electrical energy from an internal or external source. The harvested power may be supplied to the power management unit 216 to charge the power storage device 214 or to power one or more components of the tile 102 directly.

In some embodiments, as described above with reference to the wireless power source 112 of the smart floor system 100 of FIG. 1, the wireless power unit 212 may comprise a remote power receiver unit configured to receive power transmitted from a wireless power source 112, e.g. using magnetic resonance. The remote power receiver unit may include a receiver coil paired to the transmitter coil of the wireless power source 112.

In some embodiments, the wireless power unit 212 may comprise a piezoelectric power generating unit configured to harvest kinetic energy from objects applying force to the wireless smart floor tile 102. Piezoelectric technology generates electrical energy when a piezoelectric crystal is squeezed. The kinetic energy from feet or other objects compressing the tile 102 (e.g. compressing the sensing layer 206, as described below) may be used to compress piezoelectric crystals, thereby generating electrical charge that can be used to charge the power storage device 214.

Figure 2B:
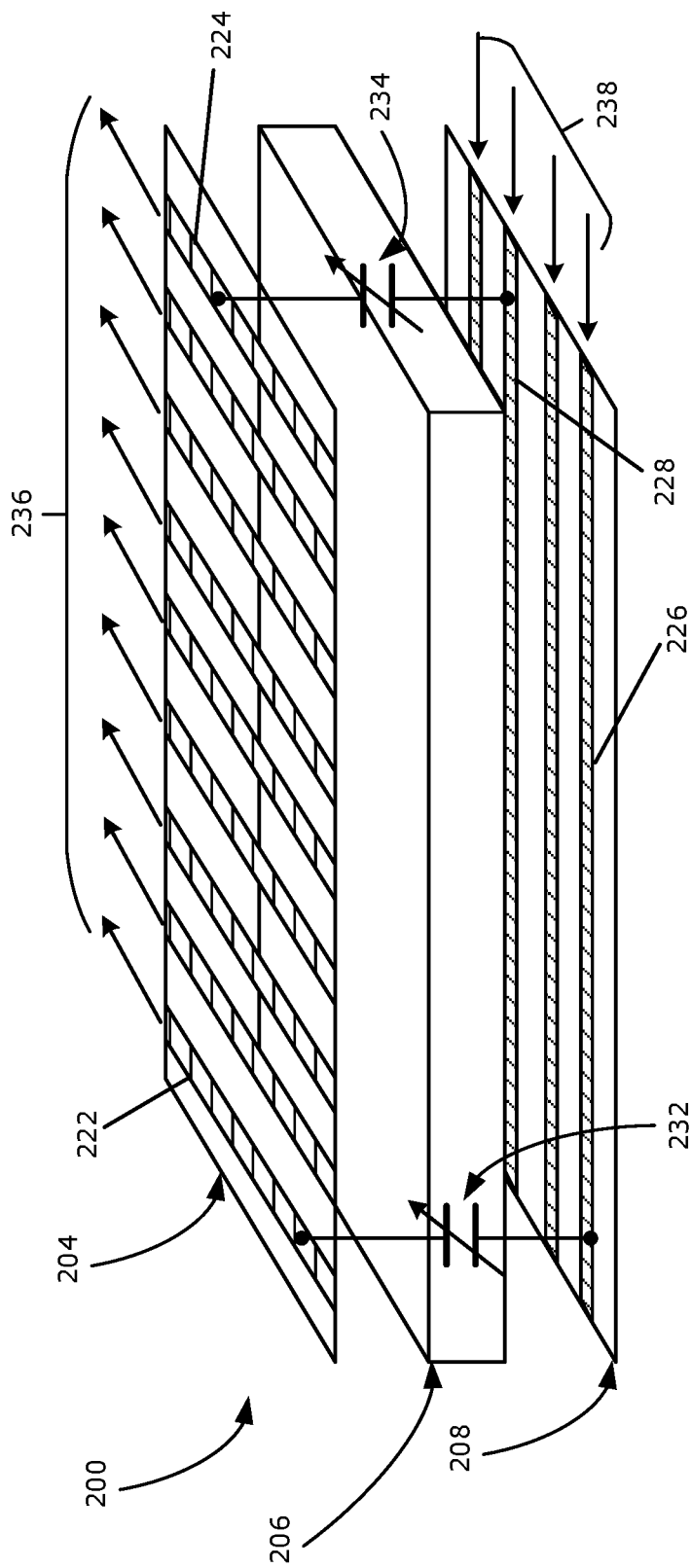
FIG. 2B is a block diagram showing an example capacitance-sensitive pressure sensor of the wireless sensing unit of FIG. 2A.

FIG. 2B is a block diagram showing an example capacitance-sensitive pressure sensor 200 of the wireless smart floor tile 102 of FIG. 2A. As described above with reference to FIG. 2A, the pressure sensor 200 consists of three layers: a transmit layer 208, a sensing layer 206, and a receive layer 204. The transmit layer 208 in this example consists of a plurality of conductive strips acting as channels for electrical signals, such as first transmit layer channel 226 and second transmit layer channel 228. Each transmit layer channel receives a transmit layer input signal 238 from the data capture circuit 210. The sensing layer 206 is an electrically sensitive layer of material exhibiting changes in its electrical properties in response to compression, such as a dielectric material. In some embodiments, the material is a capacitance sensitive material exhibiting changes in its capacitance in response to compression. In other embodiments, the material is a resistance sensitive material exhibiting changes in its resistance in response to compression. The receive layer 204 in this example consists of a plurality of conductive strips acting as channels for electrical signals, such as first receive layer channel 222 and second receive layer channel 224. Each receive layer channel provides a receive layer output signal 236 to the data capture circuit 210.

The channels of the receive layer 204 are oriented orthogonally to the direction of the channels of the transmit layer 208. Thus, the portion of the sensing layer 206 occupying each area of overlap of a receive layer channel with a transmit layer channel effectively acts to complete the circuit between the receive layer channel and transmit layer channel with an amount of capacitance determined by the amount of compression applied to that portion of the sensing layer 206. For example, the material of the sensing layer 206 situated at the area of overlap of the first receive layer channel 222 and first transmit layer channel 226 acts as a first capacitor 232 completing the circuit between the first receive layer channel 222 and first transmit layer channel 226, wherein the capacitance of the first capacitor 232 varies depending on the amount of force or compression being applied to that portion of the sending layer 206, e.g. by a person's foot or other object placed on that portion of the top surface of the tile 102. Similarly, the material of the sensing layer 206 situated at the area of overlap of the second receive layer channel 224 and second transmit layer channel 228 acts as a second capacitor 234 completing the circuit between the second receive layer channel 224 and second transmit layer channel 228 with a capacitance that varies with the amount of force or compression applied to that portion of the tile 102.

The data capture circuit 210 can thus determine the amount of force or compression being applied to each of a plurality of locations of the tile 102 based on the capacitance present in the circuit formed by any pair of transmit layer channels and receive layer channels. For example, when a transmit layer input signal 238 (e.g. a pulse) is provided to the first transmit layer channel 226, the capacitance of the first capacitor 232 affects the signal response of the first receive layer channel 222 as detected by the data capture circuit 210 through the receive layer output signal 236 of the first receive layer channel 222, and may be converted by the data capture circuit 210 into a digital signal representing the amount of force or compression of the sensing layer 206 at the corresponding portion of the tile 210. The data capture circuit 210 may aggregate a digital representation of the force or compression being applied to each location of the tile 102 corresponding to an overlap of a receive channel and a transmit channel to form a 2-dimensional pressure map. This 2D pressure map may be provided by the data capture circuit 210 to the RFID tag 202 as digital pressure data.

In one example embodiment, the data capture circuit 210 generates the digital pressure data by transmitting a series of signal pulses through the transmit channels. First, a signal pulse (i.e. transmit channel input signal 238) is transmitted through a first transmit channel (i.e., first transmit layer channel 226), and a corresponding receive channel output signal 236 is recorded by the data capture circuit from each receive channel. This first set of receive channel output signals 236 indicates the capacitance of each overlap of each receive channel with the first transmit layer channel 226. This process is then repeated for each additional transmit channel. By rapidly cycling through the transmit channels, digital pressure data can be generated for each transmit channel in sequence indicating the overlap of the current transmit channel with each receive channel. It will be appreciated that other sampling techniques may be used to sample the pressure sensor data and thereby generate a 2-dimensional grid of digital pressure data corresponding to the 2D grid of channel overlap areas.

In other embodiments, different shapes of conductive material may be used to form one or more receive channels and/or transmit channels.

In some embodiments, the digital pressure data generated by the data capture circuit 210 based on the receive layer output signals 236 may include different data from the digital 2D pressure map.

Figure 2C:
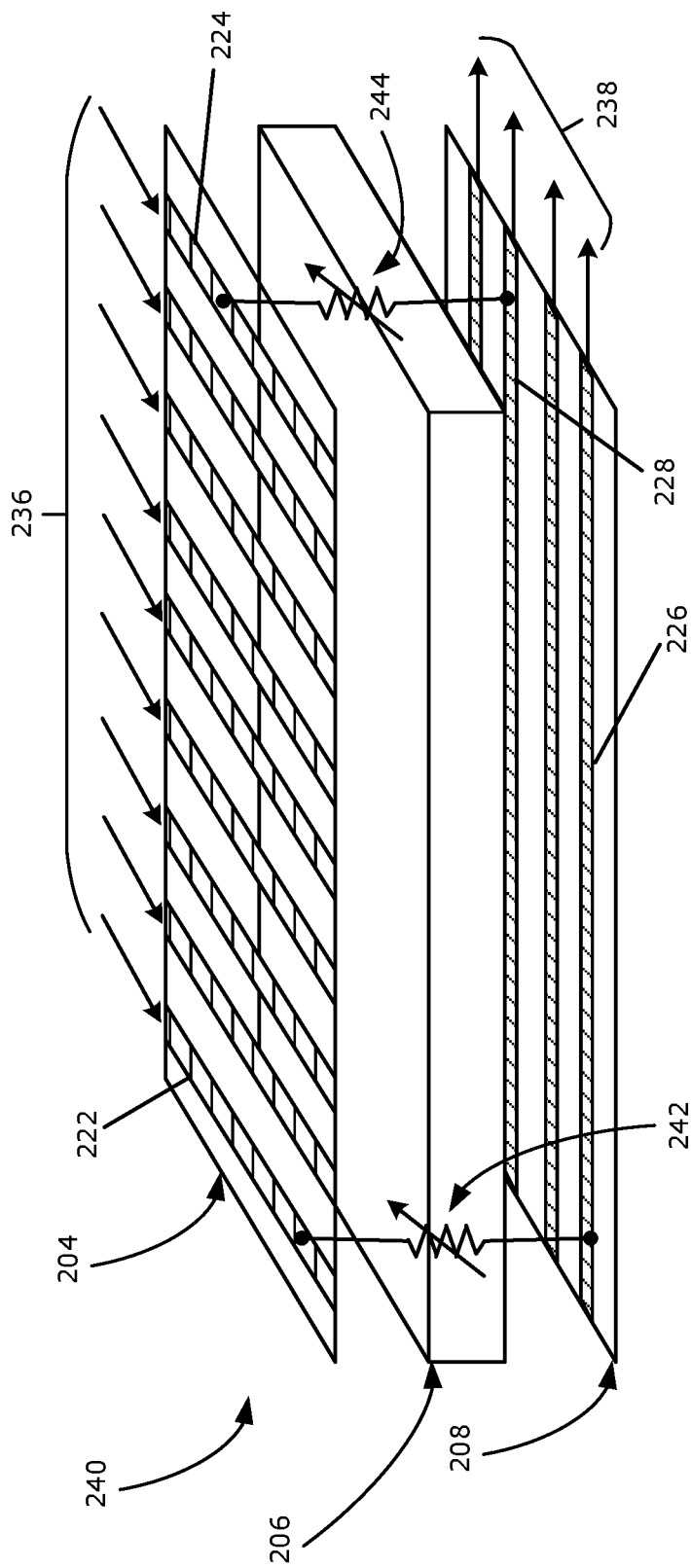
FIG. 2C is a block diagram showing an example resistance-sensitive pressure sensor of the wireless sensing unit of FIG. 2A.

FIG. 2C is a block diagram showing an example resistance-sensitive pressure sensor 240 of a wireless smart floor tile, e.g. to replace the capacitance-sensitive pressure sensor 200 of the wireless smart floor tile 102 of FIG. 2A. The resistance-sensitive pressure sensor 240 is identical to the capacitance-sensitive pressure sensor 200 of FIG. 2B except insofar as the sensing layer 206 is composed of a resistance-sensitive material. Thus, each portion of the sensing layer 206 occupying each area of overlap of a receive layer channel with a transmit layer channel effectively acts to complete the circuit between the receive layer channel and transmit layer channel with an amount of resistance determined by the amount of compression applied to that portion of the sensing layer 206. The material of the sensing layer 206 situated at the area of overlap of the first receive layer channel 222 and first transmit layer channel 226 acts as a first resistor 242 completing the circuit between the first receive layer channel 222 and first transmit layer channel 226, wherein the resistance of the first resistor 242 varies depending on the amount of force or compression being applied to that portion of the sending layer 206, e.g. by a person's foot or other object placed on that portion of the top surface of the tile 102. Similarly, the material of the sensing layer 206 situated at the area of overlap of the second receive layer channel 224 and second transmit layer channel 228 acts as a second resistor 244 completing the circuit between the second receive layer channel 224 and second transmit layer channel 228 with a resistance that varies with the amount of force or compression applied to that portion of the tile 102.

It will be appreciated that the area of overlap between each receive channel and each transmit channel acts as a capacitor (in FIG. 2B) or resistor (in FIG. 2C) and thereby enables monitoring of the pressure at each such area of the tile 102. Only two such areas are shown in FIG. 2B and FIG. 2C to avoid visual clutter. Similarly, the number of channels shown in FIGS. 2B-2C is small for the sake of simplicity and visibility; in some embodiments, the number of channels in each layer 204, 208 may be greater or less than the number shown.

Two alternative configurations 250, 260 for a wireless smart floor tile 102 placed on a ground surface 254 are shown in FIGS. 2D-2E.

FIG. 2D is a simplified side cross-sectional view of a first example configuration 250 of a wireless smart floor tile 102 on a ground surface 254. The ground surface 254 is a substrate on top of which tiles or other flooring can be installed, e.g. a concrete or plywood surface underlying a finished floor. In the first configuration 250, the wireless smart floor tile 102 is configured to be installed underneath a conventional floor tile 252, conventional floorboard, or other non-smart flooring component. In the first configuration 250, the wireless smart floor tile 102 detects pressure based on force or pressure transmitted through the conventional tile 252. Thus, a user stepping on top of the conventional tile 252 will compress portions of the wireless smart floor tile 102 directly underneath the location where the user's foot contacts the conventional tile 252, with the spread of pressure varying based on the physical properties of the conventional tile 252 (e.g. thickness, rigidity, tensile strength, elasticity). In general, the sensitivity of the pressure sensor 200 may be improved in this first configuration 250 if the conventional tile 252 is relatively thin, flexible, and elastic.

FIG. 2E is a simplified side cross-sectional view of a second example configuration 260 of a wireless smart floor tile 102 on a ground surface 254. In the second configuration 260, the wireless smart floor tile 102 includes a flooring surface 262 located above the pressure sensor 200 intended to act as the top layer of flooring for the floor area 114. Thus, the components of the wireless smart floor tile 102 are built into a floor tile or floorboard that is intended to be installed and used as the top layer of a floor.

The first configuration 250 and second configuration 260 may each have advantages. The first configuration 250 may allow users greater flexibility in using a pre-existing flooring product or selecting from a wide range of conventional flooring products, because the wireless smart floor tiles 102 are essentially accessories to a conventional flooring installation. Individual wireless smart floor tiles 102 can also be replaced as needed without disposing of an entire finished flooring tile, which may reduce the long-term expense of the system 100. On the other hand, the second configuration 260 may allow the flooring surface 262 to be selected to maximize the sensitivity of the pressure sensor 200. The second configuration 260 may also simplify the processes of installing and replacing the smart floor system 100 or individual wireless smart floor tiles 102, as there would only be a single layer of flooring to install or remove instead of two layers.

Example Floor Pressure Monitoring Device

Figure 3:
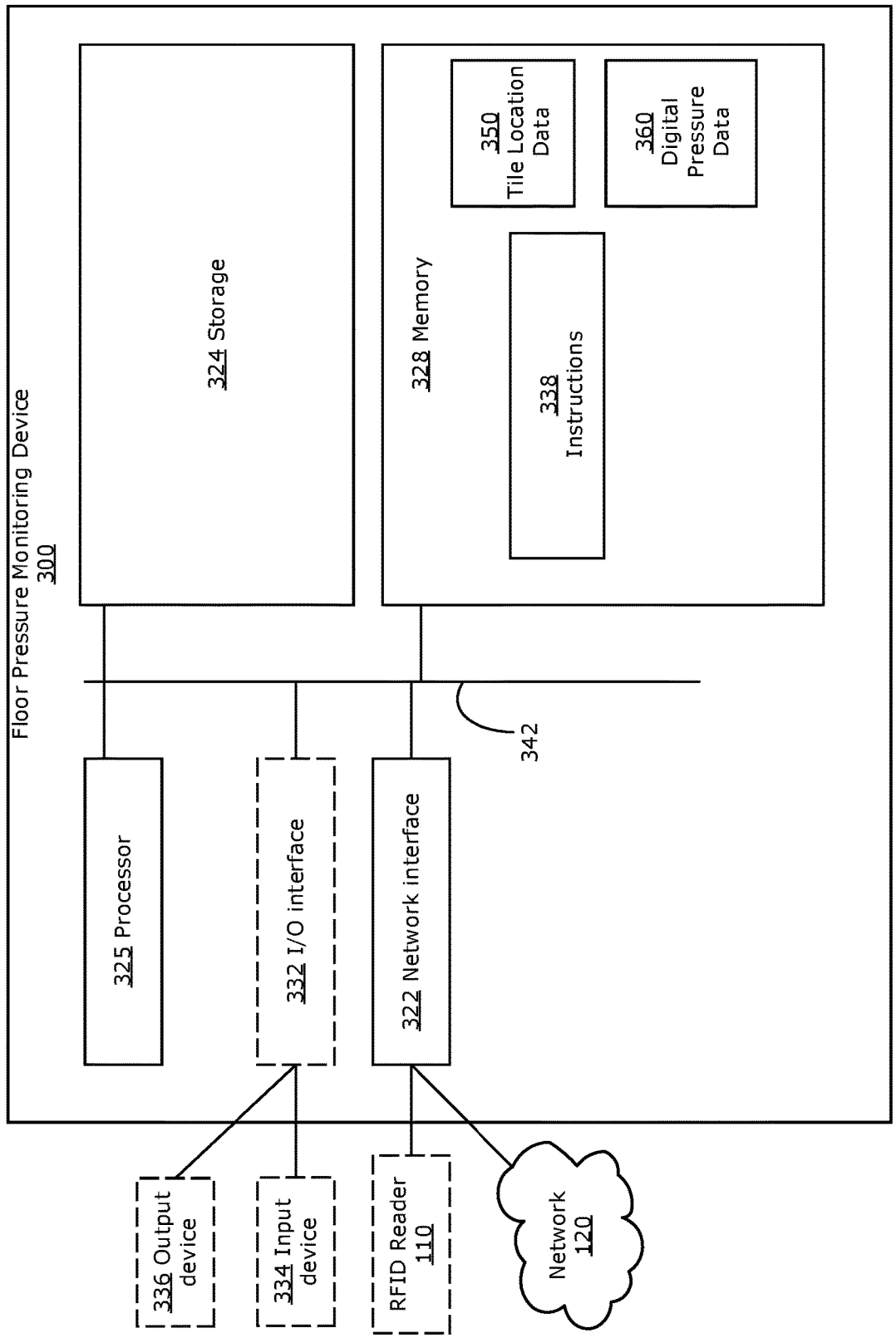
FIG. 3 is a block diagram of an example pressure monitoring device of the wireless sensing system of FIG. 1.

FIG. 3 is a block diagram of an example floor pressure monitoring device 300, such as a computer, cloud computing platform, or mobile electronic device, suitable for carrying out examples described herein. Other examples suitable for implementing embodiments described in the present disclosure may be used, which may include components different from those discussed below. Although FIG. 3 shows a single instance of each component, there may be multiple instances of each component in the floor pressure monitoring device 300.

The floor pressure monitoring device 300 may include one or more processors 325, such as a central processing unit (CPU), a graphics processing unit (GPU), a microprocessor, a digital signal processor, an application-specific integrated circuit (ASIC), a field-programmable gate array (FPGA), a dedicated logic circuitry, a dedicated artificial intelligence processor unit, or combinations thereof. The floor pressure monitoring device 300 may also include one or more optional input/output (I/O) interfaces 332, which may enable interfacing with one or more optional input devices 334 and/or optional output devices 336.

In the example shown, the input device(s) 334 (e.g., a maintenance console, a keyboard, a mouse, a microphone, a touchscreen, and/or a keypad) and output device(s) 336 (e.g., a maintenance console, a display, a speaker and/or a printer) are shown as optional and external to the floor pressure monitoring device 300. In other examples, there may not be any input device(s) 334 and output device(s) 336, in which case the I/O interface(s) 332 may not be needed.

The floor pressure monitoring device 300 may include one or more network interfaces 322 for wired or wireless communication with one or more devices or systems of a network, such as network 120. The network interface(s) 322 may include wired links (e.g., Ethernet cable) and/or wireless links (e.g., one or more antennas) for intra-network and/or inter-network communications. One or more of the network interfaces 322 may be used for receiving digital pressure data from the RFID reader 110. In some embodiments, the RFID reader 110 may communicate with the floor pressure monitoring device 300, directly or indirectly, via other means (such as an I/O interface 332). In some embodiments using wireless smart floor tiles 102 having active RFID tags, a radio antenna (such as an 802.11 antenna or Bluetooth™ antenna) may be included as part of one of the wireless network interfaces 322 to act as an RFID reader without the use of a dedicated external RFID reader 110. In each of these configurations, the interface element (e.g., network interface 322 or I/O interface 332) that is used to communicate with the RFID reader or act as an RFID reader may be referred to as an "RFID communication interface".

The floor pressure monitoring device 300 may also include one or more storage units 324, which may include a mass storage unit such as a solid state drive, a hard disk drive, a magnetic disk drive and/or an optical disk drive.

The floor pressure monitoring device 300 may include one or more memories 328, which may include a volatile or non-volatile memory (e.g., a flash memory, a random access memory (RAM), and/or a read-only memory (ROM)). The non-transitory memory(ies) 328 may store instructions for execution by the processor device(s) 325, such as to carry out examples described in the present disclosure. The memory(ies) 328 may include software instructions 338, such as for implementing an operating system and other applications/functions.

The memor(ies) 328 may also store tile location data 350, which may be collected or generated as described above with reference to FIG. 1 when each wireless smart floor tile 102, 104, 106, 108 is installed at a respective tile location 122, 124, 126, 128 of the floor area 114.

The memor(ies) 328 may also store digital pressure data 360 received from the RFID reader 110 and/or from the tiles 102 directly. The stored digital pressure data 360 may include digital pressure data samples received over time to enable software applications such as tracking the movement of a person over the floor area 114.

In some examples, the floor pressure monitoring device 300 may additionally or alternatively execute instructions from an external memory (e.g., an external drive in wired or wireless communication with the floor pressure monitoring device 300) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The floor pressure monitoring device 300 may also include a bus 342 providing communication among components of the floor pressure monitoring device 300, including those components discussed above. The bus 342 may be any suitable bus architecture including, for example, a memory bus, a peripheral bus or a video bus.

It will be appreciated that various components and operations described herein can be implemented on multiple separate devices or systems in some embodiments.

Example Method for Obtaining Floor Pressure Data

Figure 4:
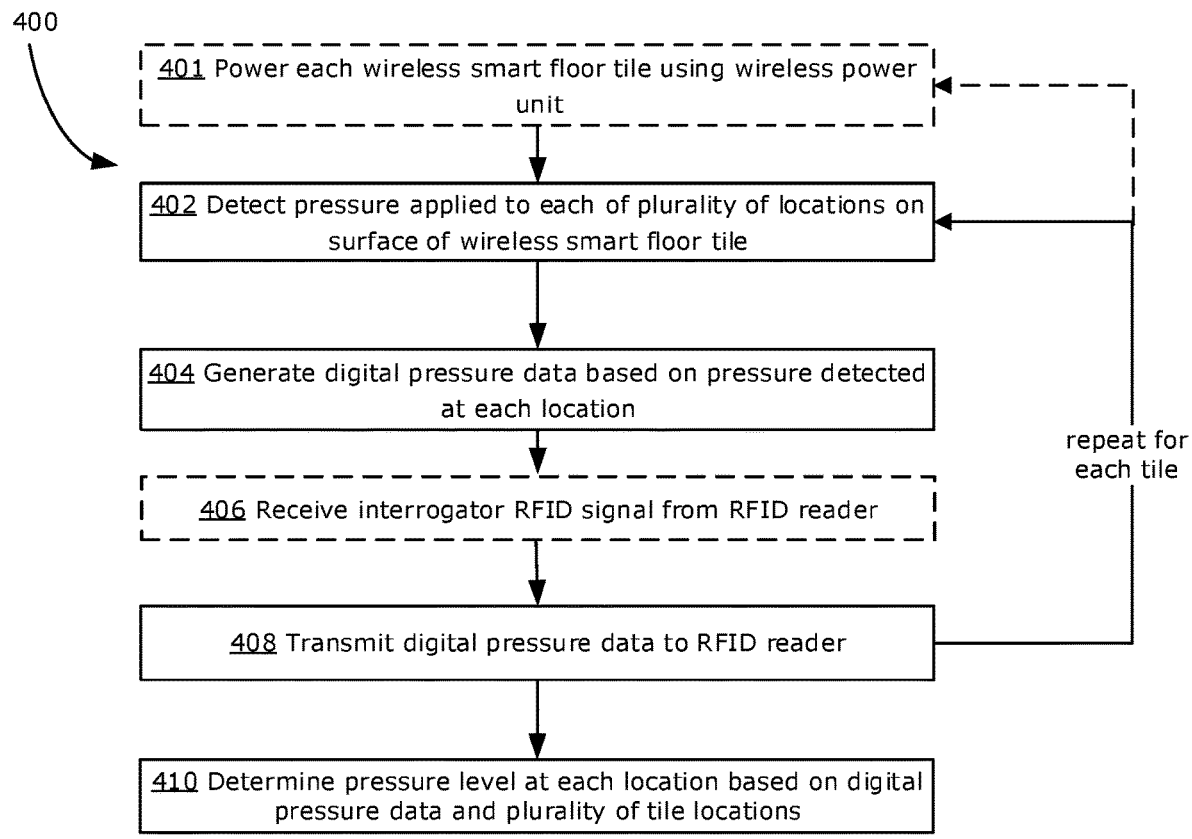
FIG. 4 is a flowchart showing steps of an example method for obtaining pressure data relating to a plurality of pressure locations of a surface area, in accordance with embodiments described herein.

FIG. 4 shows an example method 400 for obtaining pressure data relating to a plurality of pressure locations of a floor area. The method 400 may be performed using the components of the smart floor system 100 in some embodiments, as described below, but it will be appreciated that the various steps of the method 400 may also be performed by variants of the described devices and systems.

The method may optionally begin with step 401. At 401, each wireless smart floor tile 102 is powered using a wireless power unit 212. The wireless power unit 212 may provide, either directly or via a power storage device 214, the power necessary for the data capture circuit 210 to collect receive layer output signals 236 from the pressure sensor 200 and generate digital pressure data, as described above with reference to FIG. 2B.

At 402, the pressure sensor 200 detects pressure applied to each of a plurality of locations on a surface of the wireless smart floor tile 102, as described above with reference to FIG. 2B. The characteristics of the receive layer output signals 236 generated in response to the transmit layer input signals 238 from the data capture circuit 210 are determined by the pressure on each area of the sensing layer 206 corresponding to an overlap of a receive channel with a transmit channel.

At 404, digital pressure data is generated by the data capture circuit 210 based on the pressure detected at each location of the tile 102. The characteristics of the receive layer output signals 236 generated in response to the transmit layer input signals 238 from the data capture circuit 210 can be used by the data capture circuit 210 to generate a 2D grid of digital pressure data, as described above with reference to FIG. 2B.

Optionally, at step 406, the tile 102 receives an interrogator RFID signal from the RFID reader 110. This step 406 may be necessary in embodiments using passive RFID tags in the tiles 102, whereas it may be optional in embodiments using active RFID tags. Some embodiments using active RFID tags may transmit the digital pressure data to the RFID reader 110 on a regular schedule, or in response to detecting changes over a predetermined magnitude in the pressure detected at one or more locations of the tile 102. Other embodiments using active RFID tags may only transmit the digital pressure data in response to being interrogated by the RFID reader 110.

At 408, the RFID tag 202 of the tile 102 is used to transmit the digital pressure data to the RFID reader 110. As described above with reference to FIGS. 1 and 3, in some embodiments using active RFID tags the RFID reader 110 may be a network interface of the floor pressure monitoring device 300.

After step 408, the method 400 may return to step 401 or 402 for each additional wireless smart floor tile 104, 106, 108 of the smart floor system 100. It will be appreciated that each tile 102, 104, 106, 108 may perform steps 401 through 408 of the method 400 in parallel.

At 410, the floor pressure monitoring device 300 or server 130 determines a pressure level at each location of the tile 102 based on the digital pressure data and the plurality of tile locations 122, 124, 126, 128. As described above with reference to FIG. 3, the plurality of tile locations 122, 124, 126, 128 may be stored as tile location data 350 in the memory 328 of the floor pressure monitoring device 300, along with one or more samples of digital pressure data 360. By mapping the digital pressure data 360 to the tile location data 350, the processor 325 of the floor pressure monitoring device 300 may generate a 2D pressure map of the floor area 114 indicating pressure levels at a plurality of locations of each tile.

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A wireless sensing system for obtaining pressure data relating to one or more pressure locations of a surface area comprising:
    a plurality of wireless sensing units arranged fixedly in an array, each wireless sensing unit being positioned at a respective sensing unit location within the surface area and comprising:
        a pressure sensor configured to detect a continuous measure of pressure applied to each of a plurality of locations on a surface of the wireless sensing unit, the pressure sensor comprising:
            a first conductive layer comprising a plurality of conductive strips;
            an electrically sensitive layer exhibiting continuous changes in its electrical properties in response to compression; and
            a second conductive layer comprising a plurality of conductive strips,
            the conductive strips of the first conductive layer and the second conductive layer being arranged such that:
                for each respective location of the plurality of locations on the surface of the wireless sensing unit, a conductive strip of the second conductive layer overlaps with a conductive strip of the first conductive layer with respect to a vector normal to the surface of the wireless sensing unit at the respective location;
        a data capture circuit configured to generate digital pressure data based on the continuous measure of pressure detected at each of the plurality of locations by the pressure sensor;
        a radio-frequency identification (RFID) tag for transmitting the digital pressure data to an RFID reader;
        a power storage device for providing power to the pressure sensor, the data capture circuit, and the RFID tag; and
        a wireless power unit configured to wirelessly charge the power storage device, comprising a remote power receiver unit configured to receive power using magnetic resonance;
    and
    a wireless power source for transmitting power simultaneously to the remote power receiver of each of the plurality of wireless sensing units arranged fixedly in the array using magnetic resonance.

2. The wireless sensing system of claim 1, wherein the RFID tag of each wireless sensing unit transmits the pressure data at an ultra-high frequency (UHF) RFID signal band.

3. The wireless sensing system of claim 1, wherein the data capture circuit is configured to generate the digital pressure data by:
    transmitting a respective transmit layer signal to each conductive strip of the first conductive layer;
    receiving a respective feedback signal from each conductive strip of the second conductive layer; and generating the digital pressure data based on the plurality of transmit layer signals and the plurality of feedback signals.

4. The wireless sensing system of claim 1, wherein the electrically sensitive layer of each wireless sensing unit comprises a capacitance sensitive material, and the electrical properties comprise capacitance.

5. The wireless sensing system of claim 1, wherein the electrically sensitive layer of each wireless sensing unit comprises a resistance sensitive material, and the electrical properties comprise resistance.

6. The wireless sensing system of claim 1, wherein the wireless power unit of each wireless sensing unit further comprises a piezoelectric power generating unit configured to harvest kinetic energy from objects applying force to the wireless sensing unit.

7. The wireless sensing system of claim 1, wherein the RFID tag of each wireless sensing unit is a passive RFID tag.

8. The wireless sensing system of claim 1, wherein each wireless sensing unit comprises a wireless floor tile.

9. The wireless sensing system of claim 8, wherein the pressure sensor of each wireless sensing unit is configured to detect the pressure from a conventional floor tile located above the wireless sensing unit.

10. The wireless sensing system of claim 8, wherein each wireless sensing unit further comprises a flooring surface located above the pressure sensor.

11. The wireless sensing system of claim 1, further comprising a pressure monitoring system, the pressure monitoring system comprising:
a processor;
an RFID communication interface, in communication with the processor, configured to obtain digital pressure data from the RFID reader;
a memory, in communication with the processor, having stored thereon sensing unit location data indicating a plurality of sensing unit locations; and
the wireless power source, configured to transmit power to the plurality of wireless sensing units at the respective plurality of sensing unit locations using magnetic resonance;
the processor being configured for executing instructions that cause the pressure monitoring device to determine a continuous pressure level at each of one or more pressure locations based on the digital pressure data and the sensing unit location data.

12. The wireless sensing system of claim 11, wherein the pressure monitoring device further comprises the RFID reader, wherein the RFID reader is configured to obtain the digital pressure data from one or more RFID tags.

13. The wireless sensing system of claim 12, wherein:
the RFID communication interface comprises a wireless network interface; and
the RFID reader comprises a radio antenna.

14. A method for obtaining pressure data relating to one or more pressure locations of a surface area, comprising:
for each of a plurality of wireless sensing units arranged fixedly in an array at a respective plurality of sensing unit locations within the surface area:
receiving power at the wireless sensing unit from a wireless power source using magnetic resonance;
charging a power storage device of the wireless sensing unit using the received power;
using the power storage device to provide power to a pressure sensor, a data capture circuit, and a radio-frequency identification (RFID) tag of the wireless sensing unit, the pressure sensor comprising:
a first conductive layer comprising a plurality of conductive strips;
an electrically sensitive layer exhibiting continuous changes in its electrical properties in response to compression; and
a second conductive layer comprising a plurality of conductive strips,
the conductive strips of the first conductive layer and the second conductive layer being arranged such that:
for each respective location of the plurality of locations on the surface of the wireless sensing unit, a conductive strip of the second conductive layer overlaps with a conductive strip of the first conductive layer with respect to a vector normal to the surface of the wireless sensing unit at the respective location;
detecting a continuous measure of pressure applied to each of one or more locations on a surface of the wireless sensing unit using the pressure sensor;
generating digital pressure data based on the continuous measure of pressure detected at each of the one or more locations by the pressure sensor using the data capture circuit; and
transmitting the digital pressure data to an RFID reader using the RFID tag.

15. The method of claim 14, further comprising determining a pressure level at each of the one or more pressure locations based on the digital pressure data and the one or more sensing unit locations.

16. The method of claim 14, wherein:
the RFID tag of each wireless sensing device is a passive RFID tag;
the RFID reader is configured to transmit interrogator RFID signals to each RFID tag; and
each RFID tag is configured to transmit the digital pressure data to the RFID reader in response to receiving an interrogator RFID signal from the RFID reader.

17. The method of claim 14, wherein the RFID tag of each wireless sensing unit transmits the digital pressure data at an ultra-high frequency (UHF) RFID signal band.

18. The method of claim 14, wherein the data capture circuit generates the digital pressure data based on the continuous measure of pressure detected at each of the one or more locations by the pressure sensor by:
transmitting a respective transmit layer signal to each conductive strip of the first conductive layer;
receiving a respective feedback signal from each conductive strip of the second conductive layer; and
generating the digital pressure data based on the plurality of transmit layer signals and the plurality of feedback signals.

19. The method of claim 14, wherein the electrically sensitive layer of each wireless sensing unit comprises a capacitance sensitive material, and the electrical properties comprise capacitance.

20. The method of claim 14, wherein the electrically sensitive layer of each wireless sensing unit comprises a resistance sensitive material, and the electrical properties comprise resistance.

* * * * *